United States Patent [19]

Tsukada

[11] Patent Number: 5,315,894
[45] Date of Patent: May 31, 1994

[54] STOPPER DEVICE FOR LINEAR GUIDE DEVICE

[75] Inventor: Toru Tsukada, Gunma, Japan
[73] Assignee: NSK Ltd., Tokyo, Japan
[21] Appl. No.: 858,649
[22] Filed: Mar. 27, 1992

[30] Foreign Application Priority Data

Apr. 5, 1991 [JP] Japan ................................. 3-22022

[51] Int. Cl.$^5$ ........................ G05G 1/04; E05D 13/00
[52] U.S. Cl. ..................................... 74/526; 16/86 R;
16/86 A
[58] Field of Search ............... 74/526, 527; 192/116.5,
192/138; 16/82, 86 R, 86 A; 384/44

[56] References Cited

U.S. PATENT DOCUMENTS

| | | | |
|---|---|---|---|
| 1,830,383 | 11/1931 | Bos . | |
| 2,621,962 | 12/1952 | Jackson | 16/86 R |
| 2,721,597 | 10/1955 | Pitrella | 16/86 R |
| 4,351,868 | 9/1982 | Otani | 16/86 A |
| 4,532,672 | 8/1985 | Anderson | 16/86 A |
| 4,753,126 | 6/1988 | Sammaratano | 74/526 |
| 4,838,111 | 6/1989 | Schmidt | 74/526 |

FOREIGN PATENT DOCUMENTS

| | | |
|---|---|---|
| 60-112722 | 7/1985 | Japan . |
| 62-255612 | 11/1987 | Japan . |
| 2300517 | 12/1990 | Japan . |
| 619022 | 8/1980 | Switzerland .................. 16/86 R |

*Primary Examiner*—Vinh T. Luong
*Attorney, Agent, or Firm*—Sughrue, Mion, Zinn, Macpeak & Seas

[57] ABSTRACT

A stopper device for a linear guide device, the linear guide device comprising a guide rail having axial rolling member-rolling grooves at opposite side surfaces thereof, and a slider loosely fitted on the guide rail so as to move along the guide rail, the slider having rolling member-rolling grooves disposed in opposed relation to the rolling member-rolling grooves of the guide rail, respectively, the slider and the guide rail being movable relative to each other through the rolling of a number rolling members held between the opposed rolling member-rolling grooves. The stopper device comprises a stopper body of a generally U-shaped cross-section mounted astride an upper surface of the guide rail; a hole before threading which is formed through one end portion of the stopper body, and is open toward the side surface of the guide rail; and a covering member of an elastic material which covers at least an inner surface of that portion of the stopper body which is disposed in opposed relation to the guide rail and includes the open end of the hole before threading.

18 Claims, 3 Drawing Sheets

STOPPER DEVICE FOR LINEAR GUIDE DEVICE

BACKGROUND OF THE INVENTION

This invention relates to a stopper device for a linear guide device which is attached to a guide rail so as to prevent a slider from being disengaged from the guide rail during the transport of the linear guide device and also to function as a mechanical stopper during the operation of the linear guide device.

A conventional stopper device for a linear guide device is disclosed, for example, in Japanese Laid-Open Patent Application No. 2-300517. In this conventional construction, a stopper body, formed by bending a steel plate into a C-shape, has a pair of hook portions formed respectively at opposite side edges thereof, the hook portions being engaged respectively in guide member rolling grooves formed respectively in opposite side surfaces of the guide rail. A threaded hole is formed through the central portion of the stopper body. A screw member threaded into the threaded hole is pressed at its distal end against the upper surface of the guide rail, and the reaction force of this pressing force increases the force of engagement between the hook portions and the rolling member-rolling grooves so as to fix the stopper device relative to the guide rail, thereby limiting an accidental movement of the slider.

In such a conventional stopper device for the linear guide device, however, the screw member is threaded in a direction perpendicular to the hook portions, engaged in the respective grooves of the rail, to thereby raise the central portion of the stopper body upward to resiliently deform the same. As a result, a fixing force for holding the rail between the hook portions is produced by the bending moment causing the hook portions to be engaged in the respective guide member grooves.

Therefore, there has been encountered a problem that the important groove surfaces of the rail and the upper surface of the rail are damaged by the hook portions of steel, engaged in the guide member grooves of the guide rail, and the distal end of the screw member pressed against the upper surface of the guide rail.

Moreover, when the stopper device is to be attached and detached, this must be done from the axial end of the guide rail, and the position of mounting of the stopper device must avoid a bolt insertion hole of the guide rail. Thus, there have been problems that there are many limitations with respect to the mounting manner and that much time and labor are required.

Further, since the steel plate is pressed into a C-shape, many manhours are required for and additionally high degree of accuracy is required for properly engaging the ends with the groove surfaces of the rail. As a result, there is a high manufacturing cost.

SUMMARY OF THE INVENTION

The present invention has been made in order to overcome the above problems, and an object of the invention is to provide a stopper device for a linear guide device which can be attached to a guide rail of the linear guide device without damaging the guide rail, and can be attached to and detached from the guide rail at a desired position, and can be easily shaped, and can be produced at low costs.

According to the present invention, there is provided a stopper device for a linear guide device, said linear guide device comprising a guide rail having axial guide rail grooves at opposite side surfaces thereof, and a slider loosely fitted on said guide rail so as to move along said guide rail, said slider having rolling member grooves disposed in opposed relation to said grooves of said guide rail, respectively, slider and guide rail being movable relative to each other by a plurality of rolling members held between the opposed member grooves and the guide rail grooves.

The stopper device comprises a stopper body of a generally U-shaped cross-section mounted astride an upper surface of said guide rail; a hole before threading which is formed through one end portion of said stopper body, and is open toward the side surface of said guide rail; and a covering member of an elastic material which covers at least an inner surface of that portion of said stopper body which is disposed in opposed relation to said guide rail and includes the open end of said hole before threading.

In order to prevent the slider from being disengaged from the guide rail during the transport of the linear guide device, the stopper device is pressed from the upper surface side of the guide rail at a desired position of the guide rail, and is attached to the guide rail in such a manner that opposite legs of the U-shaped stopper device hold the guide rail therebetween. The covering layer of an elastic material on the inner surface is pressed against the surface of the guide rail to be fixed thereto, thereby preventing the axial movement of the slider to prevent the slider from dropping from the end of the guide rail.

When the stopper device is to be used as a mechanical stopper for positively stopping the slider at a predetermined position so as to prevent the overrunning of the slider during tho operation of the linear guide device, the hole before threading, which is provided at one end portion of the stopper body, is tapped into a threaded hole. The stopper device is pressed from the upper surface side of the guide rail at a desired position of the guide rail, and then a fastening bolt is threaded into the threaded hole, and is tightened. The covering layer of the elastic material is urged and projected toward the side surface of the guide rail by the distal end of the fastening bolt. Thus, the fastening bolt is strongly pressed against the side surface of the guide rail or the rolling member-rolling groove surface through the covering layer of the elastic material, thereby firmly fixing the stopper device. The distal end of the fastening bolt is not in direct contact with the guide rail surface, and therefore the guide rail is not damage.

DETAILED DESCRIPTION OF THE PREFERRED EMBODIMENTS

Figure 1:
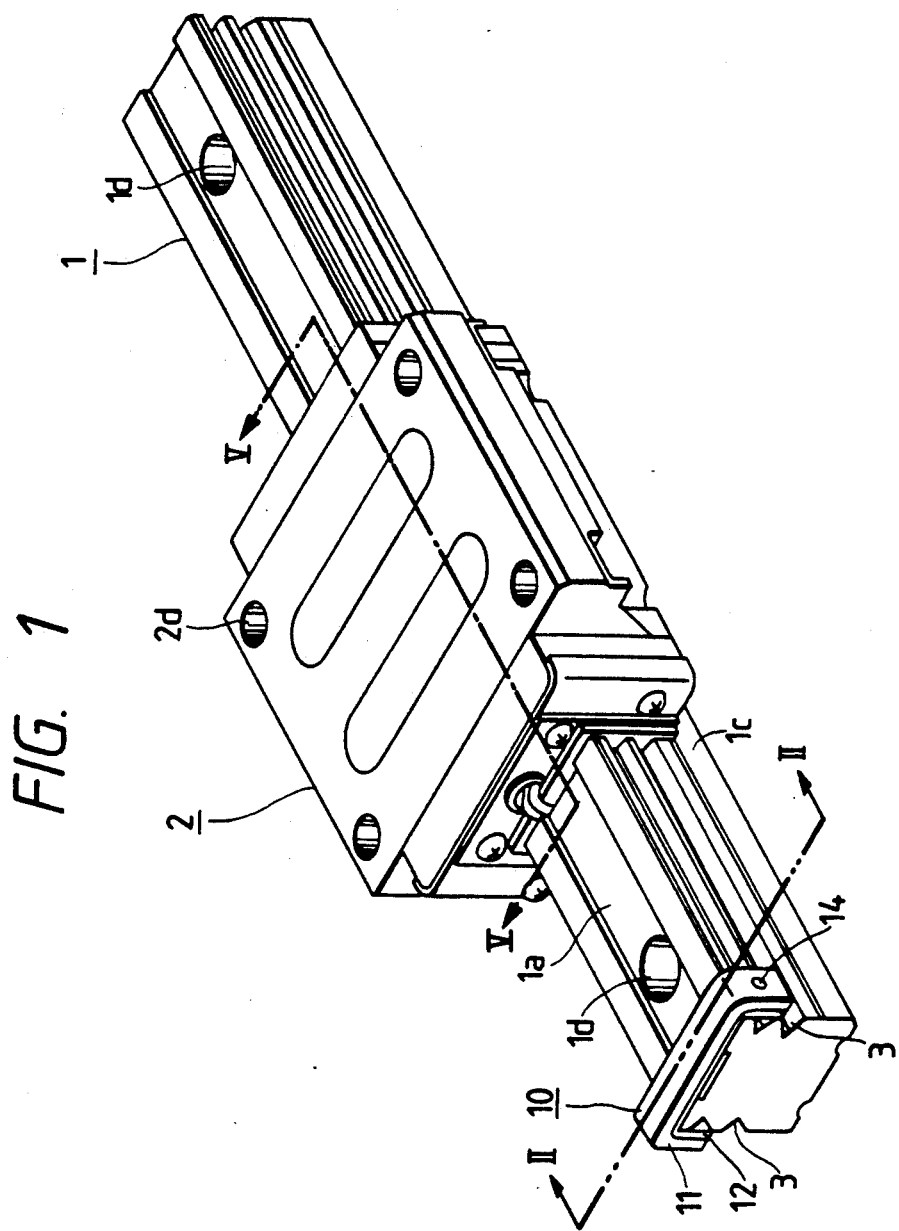
FIG. 1 is a perspective view of an overall construction of a linear guide device having one preferred embodiment of a stopper device the invention attached thereto.
Figure 2:
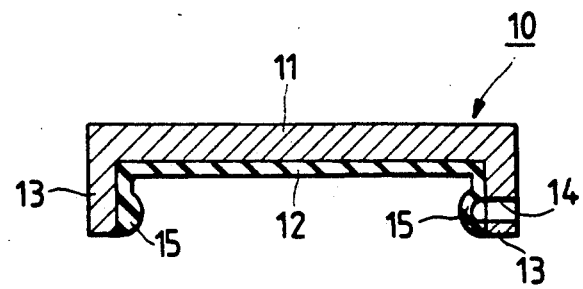
FIG. 2 is a cross-sectional view of the stopper device taken along the line II—II of FIG. 1.
Figure 5:
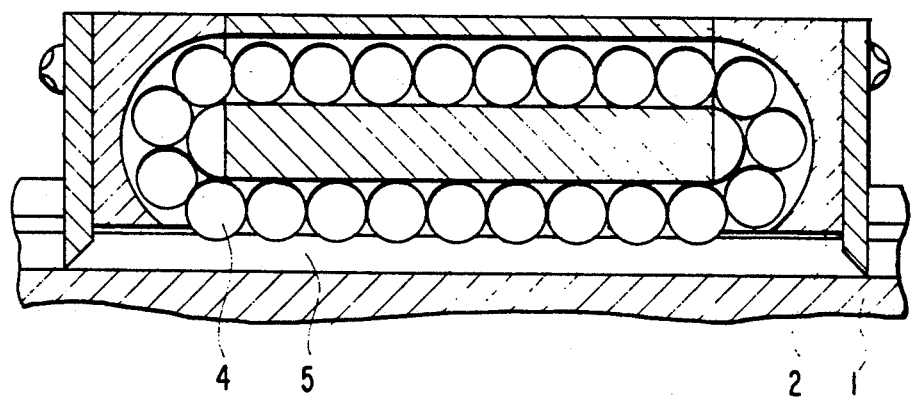
FIG. 5 is a cross-sectional view of the stopper device taken along line V—V of FIG. 1.

A preferred embodiment of the present invention will now be described with reference to the drawings. FIG. 1 is a perspective view of an overall construction of a linear guide device having a stopper device attached thereto, and FIG. 2 is a cross-sectional view of the stopper device. A guide rail 1 of the linear guide device has axial guide rail grooves 3 formed respectively in opposite side surfaces 1c thereof. As shown in FIG. 5, slider 2 straddling the elongate guide rail 1 has at its inner surface member-rolling grooves 5 disposed in opposed relation to the guide rail grooves 3, respectively. A number of rolling members (balls or rollers) are rotatably held between these opposed grooves. When the slider 2 is moving along the guide rail 1, these rolling members rotatably move, and are circulated along a circulating path provided in the slider 2.

In use, the guide rail 1 is fixedly secured to a base of a machine tool, a robot, a measuring instrument, a precise positioning table, or the like by mounting bolts through mounting bolt holes 1d. A driven member, such as a tool post of the machine tool, is fastened to the slider 2 by mounting bolts through mounting bolt holes 2d. A linear movement of this driven member is guided by the slider 2 capable of smoothly moving along the guide rail 1.

The stopper device 10 is of a double construction comprising a metallic stopper body 11, and a covering layer 12 of a soft elastic material, such as rubber and a synthetic resin, fixedly secured to the inner surface of the stopper body 11 by baking, bonding or the like.

The stopper body 11 is formed by pressing a steel plate into a generally U-shaped cross-section. The stopper body 11 has a hole 14 before threading, which extends through one leg 13 thereof in the direction of the thickness of the steel plate. In this embodiment, although the hole 14 before threading is open in opposed relation to the guide rail groove 3 when the stopper device 10 is attached to the guide rail, this hole may be so arranged as to be open in opposed relation to a flat portion of the side surface 1c of the guide rail.

The covering layer 12 covers the entire inner surface of the stopper body 11 including that portion thereof to which the hole 14 before threading is open. In this embodiment, those portions of this covering layer disposed in opposed relation to the guide rail grooves 3 provided in the opposite side surfaces of the guide rail are projected inwardly to provide groove engagement projections 15.

The operation will now be described.

The stopper device 10 is used for preventing the slider 2 from dropping from the end of the guide rail 1 during the transport of the linear guide device. In this case, the stopper device 10 is disposed astride an upper surface 1a of the guide rail 1 at a desired position of the guide rail, and then the stopper device 10 is pressed from the upper side to be attached to the guide rail 1 in such a manner that the opposite legs 13 and 13 of the U-shaped stopper device 10 hold the guide rail 1 therebetween. The covering layer 12 at the inner surface is resiliently pressed against the surface of the guide rail 1, and the groove engagement projections 15 are engaged in guide rail grooves 3 of the guide rail, respectively. Thus, the stopper device 10 is fixed to prevent the movement of the slider 2 in the axial direction, thereby preventing the slider from dropping from the end of the guide rail.

In this embodiment, the stopper device can be easily produced by pressing the steel plate into a simple C-shape, and a high working accuracy is not required, and therefore advantageously the stopper device can be provided at low costs.

The metallic stopper body 11 is not in direct contact with the guide rail 1, and holds the guide rail through the covering layer 12. Therefore, there is an advantage that the guide rail surface is not damaged.

Further, the stopper device can be attached to the guide rail by a simple operation, that is, by press-fitting the stopper device astride the guide rail. Additionally, and advantageously, the stopper device can be attached to the guide rail quicker.

Further, with respect to the mounting position, it is not necessary to avoid the bolt insertion holes 1d of the guide rail, and the mounting position can be arbitrarily chosen.

Figure 3:
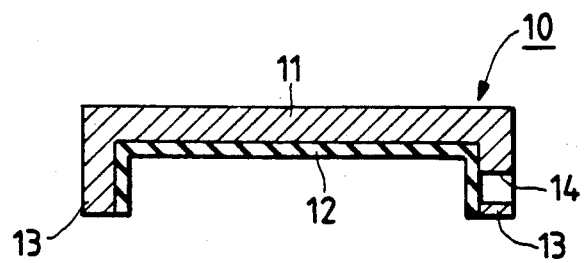
FIG. 3 is a cross-sectional view of another embodiment of a stopper device.

FIG. 3 shows another embodiment.

A stopper device 10 of this embodiment differs from the above embodiment in that the groove engagement projections 15 are not provided on the covering layer 12 and that these portions are flat along the stopper body 11. When this stopper device is attached to the guide rail 1, the ability of preventing the movement of the slider 2 is lower because there is no portion fitted in the rolling member-rolling groove 3, but the cost of a mold for forming the covering layer 12 is low, and therefore there is an advantage that the stopper device can be provided more inexpensively. This type is suited for the linear guide device of a compact, lightweight construction.

Figure 4:
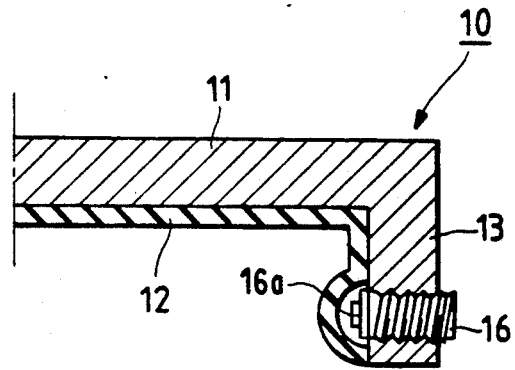
FIG. 4 is an enlarged, cross-sectional view of an important portion of an applied example of the above embodiments.

FIG. 4 shows an applied example of the above embodiments.

In this example, the stopper device is used as a mechanical stopper for positively stopping the slider 2 at a predetermined position of the guide rail 1 to prevent the overrunning when the linear guide device mounted on the machine is operated. In this case, first, the hole 14 before threading, which is preformed in one end of the stopper body 11 of the stopper device 10, is tapped into a threaded hole. Then, the stopper device 10 is attached to a desired position (at which the slider 2 is desired to be stopped) of the guide rail by pressing it from the side of the upper surface 1a of the guide rail. Then, a fastening bolt 16 having a hexagonal head hole is threaded into the threaded hole 14, and is tightened. As a result, the covering layer 12 of an elastic material is urged by the distal end 16a of the fastening bolt 16 to be projected toward the side surface of the guide rail. Thus, the fastening bolt 16 is strongly pressed against the flat portion of the side surface 1c of the guide rail or the groove surface of the rolling member-rolling groove 3 through the covering layer 12, thereby firmly fixing the stopper device 10 in a manner to withstand the striking of the slider, 2 against the stopper device 10. Since the distal end 16a of the fastening bolt 16 is not in direct contact with the guide rail surface, the guide rail is not damaged.

The threaded hole for the fastening bolt 16 can be provided merely by tapping the hole 14 before threading which is preformed when the stopper body 11 is shaped, and therefore a cumbersome machining is not necessary, and the manhour is small.

In the above embodiments and the applied example thereof, although the covering layer 12 covers only the entire inner surface of the stopper body 11, the invention is not limited to such an arrangement, and the covering layer may cover the entire surface of the stopper body 11, in which case an enhanced rust prevention effect can be obtained, and besides a better appearance is obtained.

As described above, the stopper device of the present invention for the linear guide device comprises the stopper body of a generally U-shaped cross-section mounted astride the upper surface of the guide rail, and the hole before threading is formed through one end portion of the stopper body, and is open toward the side surface of the guide rail, and the covering member of an elastic material covers at least the inner surface of that portion of the stopper body which is disposed in opposed relation to the guide rail and includes the open end of the hole before threading. Therefore, advantageously, there is provided the stopper device for the linear guide device which can be manufactured easily at low cost and can be attached to a desired position of the guide rail, and will not damage the guide rail.

While the present invention has been described above with respect to preferred embodiments thereof, it should of course be understood that the present invention should not be limited only to these embodiments but various changes or modifications may be made without departure from the scope of the invention as defined by the appended claims.

What is claimed is:

1. A stopper device for a linear guide device, wherein said linear guide device has a guide rail having axial guide rail grooves formed in opposite side surfaces thereof, a slider loosely fitted on said guide rail so as to move along said guide rail, said slider having rolling member grooves formed therein in opposed relation to said guide rail grooves of said guide rail, respectively, said slider and said guide rail being movable relative to each other through the rolling of a plurality rolling members held between said opposed guide rail grooves and rolling member grooves, said stopper device (10) comprising:
   a stopper body (11) of a generally U-shaped cross-section mounted astride an upper surface of said guide rail, said stopper body (11) comprising an upper portion and leg portions (13) respectively extending from edge portions of said upper portion;
   a covering member (12) made of an elastic material which covers an inner surface of said stopper body and which is disposed in opposed relation to said opposite side surface of said guide rail.

2. A stopper device for a linear guide device according to claim 1, in which said stopper body (11) is made of steel and said covering member (12) is made of a rubber material, said covering member being fixedly secured to said inner surface of said stopper body.

3. A stopper device for a linear guide device according to claim 2, in which said covering member (12) has at least one groove engagement projection (15) which is formed at a position which is in opposition to said guide rail grooves of said guide rail, wherein said groove engagement projection is engaged in said rolling member-rolling grooves of said guide rail.

4. A stopper device for a linear guide device according to claim 3, in which at least one of said leg portions is provided with a threaded hole (14) which is formed at a position which is in opposition to said guide rail grooves of said guide rail, wherein said stopper device further comprises a bolt (16) which is threaded into said threaded hole in such a manner that a tip end of said bolt is brought in pressure contact with said guide rail grooves through said cover member.

5. A stopper device for a linear guide device according to claim 2, in which said leg portions are substantially flat.

6. A stopper device for a linear guide device according to claim 5, in which at least one of said leg portions is provided with a threaded hole (14) which is formed at a position which is in opposition to said guide rail grooves of said guide rail, wherein said stopper device further comprises a bolt (16) which is threaded into said threaded hole in such a manner that a tip end of said bolt is brought in pressure contact with said guide rail grooves through said cover member.

7. A stopper device for a linear guide device according to claim 2, in which at least one of said leg portions is provided with a threaded hole (14) which is formed at a position which is in opposition to said guide rail grooves of said guide rail, wherein said stopper device further comprises a bolt (16) which is threaded into said threaded hole in such a manner that a tip end of said bolt is brought in pressure contact with said guide rail grooves through said cover member.

8. A stopper device for a linear guide device according to claim 1, in which said stopper body (11) is made of steel, and said covering member (12) is made of a synthetic resin, said covering member is fixedly secured to said inner surface of said stopper body.

9. A stopper device for a linear guide device according to claim 8, in which said covering member (12) has at least one groove engagement projection (15) which is formed at a position which is in opposition to said guide rail grooves of said guide rail, wherein said groove engagement projection is engaged in said guide rail grooves of said guide rail.

10. A stopper device for a linear guide device according to claim 9, in which at least one of said leg portions is provided with a threaded hole (14) which is formed at a position which is in opposition to said guide rail grooves of said guide rail, wherein said stopper device further comprises a bolt (16) which is threaded into said threaded hole in such a manner that a tip end of said bolt is brought in pressure contact with said guide rail grooves through said cover member.

11. A stopper device for a linear guide device according to claim 8, in which said leg portions are substantially flat.

12. A stopper device for a linear guide device according to claim 11, in which at least one of said leg portions is provided with a threaded hole (14) which is formed at a position which is in opposition to said guide rail grooves of said guide rail, wherein said stopper device further comprises a bolt (16) which is threaded into said threaded hole in such a manner that a tip end of said bolt is brought in pressure contact with said guide rail grooves through said cover member.

13. A stopper device for a linear guide device according to claim 8, in which at least one of said leg portions is provided with a threaded hole (14) which is formed at a position which is in opposition to said guide rail grooves of said guide rail, wherein said stopper device further comprises a bolt (16) which is threaded into said threaded hole in such a manner that a tip end of said bolt is brought in pressure contact with said guide rail grooves through said cover member.

14. A stopper device for a linear guide device according to claim 1, in which said covering member (12) has at least one groove engagement projection (15) which is formed at a position which is in opposition to said guide rail grooves of said guide rail, wherein said groove engagement projection is engaged in the guide rail grooves of said guide rail.

15. A stopper device for a linear guide device according to claims 14, in which at least one of said leg portions is provided with a threaded hole (14) which is formed at a position which is in opposition to said guide rail grooves of said guide rail, wherein said stopper device further comprises a bolt (16) which is threaded into said threaded hole in such a manner that a tip end of said bolt is brought in pressure contact with said guide rail grooves through said cover member.

16. A stopper device for a linear guide device according to claim 1, in which said leg portions are substantially flat.

17. A stopper device for a linear guide device according to claim 16, in which at least one of said leg portions is provided with a threaded hole (14) which is formed at a position which is in opposition to said guide rail grooves of said guide rail, wherein said stopper device further comprises a bolt (160) which is threaded into said threaded hole in such a manner that a tip end of said bolt is brought in pressure contact with said guide rail grooves through said cover member.

18. A stopper device for a linear guide device according to claim 1, in which at least one of said leg portions is provided with a threaded hole (14) which is formed at a position which is in opposition to said guide rail grooves of said guide rail, wherein said stopper device further comprises a bolt (16) which is threaded into said threaded hole in such a manner that a tip end of said bolt is brought in pressure contact with said guide rail grooves through said cover member.

* * * * *